United States Patent
Yabe et al.

(10) Patent No.: US 7,036,646 B2
(45) Date of Patent: May 2, 2006

(54) WET-TYPE MULTIPLE DISC CLUTCH

(75) Inventors: Hiroshi Yabe, Kakegawa (JP);
Yasuhito Koike, Iwata (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/772,317

(22) Filed: Feb. 6, 2004

(65) Prior Publication Data

US 2004/0168878 A1  Sep. 2, 2004

(30) Foreign Application Priority Data

Feb. 7, 2003  (JP)  ............................. 2003-031507

(51) Int. Cl.
*F16D 13/59*  (2006.01)

(52) U.S. Cl. .............................. 192/106 F; 192/85 AA

(58) Field of Classification Search ............ 192/106 F, 192/110 R, 112, 85 AA, 85 CA, 109 F
See application file for complete search history.

(56) References Cited

U.S. PATENT DOCUMENTS 3,602,347 A * 8/1971 Yamaguchi et al. ..... 192/106 F
3,677,381 A * 7/1972 Takagi et al. ............ 192/106 F
3,944,036 A * 3/1976 Koshelev ................. 192/109 F
4,732,253 A * 3/1988 Hiramatsu et al. ....... 192/87.11
4,805,752 A * 2/1989 Malloy et al. ........... 192/85 AA
5,865,289 A * 2/1999 Ishimaru .................. 192/87.11
6,021,879 A * 2/2000 Pelouch ................... 192/106 F
6,675,944 B1 * 1/2004 Lee ......................... 192/106 F

FOREIGN PATENT DOCUMENTS

| JP | 60-84428 | 5/1985 |
|---|---|---|
| JP | UM 2-96030 | 7/1990 |
| JP | 9-60660 | 3/1997 |
| JP | 2001-241467 | 9/2001 |

\* cited by examiner

*Primary Examiner*—Saul Rodriguez
(74) *Attorney, Agent, or Firm*—Miles & Stockbridge PC

(57) ABSTRACT

A wet-type multiple disc clutch comprises a clutch plate set having a plurality of friction plates and a plurality of separator plates alternately interposed between a clutch case and a clutch hub. An oil pressure piston slidably retained in a cylinder chamber is disposed between inner and outer cylindrical members of the clutch case and serves to fasten the clutch plate set. A canceler for defining a centrifugal oil pressure cancel chamber between the oil pressure piston and the clutch case is secured on the inner cylindrical member of the clutch case through a stop ring. A detention portion is provided on the canceler for preventing the stop ring from falling out of position.

15 Claims, 4 Drawing Sheets

WET-TYPE MULTIPLE DISC CLUTCH

This application claims the benefit of Japanese Patent application No. 2003-031507 which is hereby incorporated by reference.

BACKGROUND OF THE INVENTION

1. Field of the Invention

The present invention relates to a wet-type multiple disc clutch which is used in an automatic transmission or the like of a car.

2. Related Background Art

An automatic transmission of a car generally comprises a planetary gear shifting mechanism of three to five speed levels, in addition to a torque converter serving as a fluid joint, and the speed is changed by properly fixing or releasing a constituent element such as a sun gear or a planetary gear of the planetary gear shifting mechanism by the use of frictional engagement means such as a clutch or a brake. As the frictional engagement means to be built in the automatic transmission, a wet-type multiple disc clutch having a clutch plate set in which friction plates and separator plates are alternately provided is employed except in some band-type brakes. On the other hand, an oil pressure piston which is driven by a pressure oil from a transmission control oil pressure circuit is used for pressure contact (frictional engagement) of the clutch plate set.

In order to release the clutch plate set in the wet-type multiple disc clutch, it is required to discharge an operation oil from a cylinder chamber which drives the oil pressure piston. For this reason, a return spring such as a compression coil spring or a coned disc spring is often interposed between the clutch case and the oil pressure piston, thereby urging the oil pressure piston to the cylinder chamber side all the time. However, since the clutch case is generally rotated at high speed, an oil pressure (centrifugal oil pressure) is generated on the operation oil inside the cylinder chamber due to the centrifugal force, so that the operation oil may not be discharged smoothly from the cylinder chamber only with the return spring. In this case, the clutch may not be released swiftly, or the friction plates and the separator plates may not be sufficiently separated from each other, thereby generating a dragging of the clutch.

In order to solve such problems, a centrifugal oil pressure cancel chamber is provided between the oil pressure piston and the clutch case so as to offset the centrifugal oil pressure in the cylinder chamber by the centrifugal oil pressure of the operation oil inside the centrifugal oil pressure cancel chamber (see, for example, Japanese Patent Application Laid-Open No. 2001-241467, P. 4, FIG. 2, and Japanese Patent Application Laid-Open No. Hei 09-060660, P. 3, FIG. 2). The centrifugal oil pressure cancel chamber is generally defined inside the oil pressure piston by a disc-shaped canceler which also serves as a retainer of the return spring. The canceler is detained on an inner tube of the clutch case by a stop ring.

In the wet-type multiple disc clutch described above, the canceler is pressed against the end surface of the stop ring all the time by the spring force of the return spring which is interposed between the canceler and the oil pressure piston. However, in an automatic transmission which is provided with a take-off clutch of a multiple disc wet type, instead of a torque converter, the canceler is sometimes moved toward the cylinder chamber side against the spring force of the return spring by the pressure of a lubricating oil inside the take-off clutch case.

FIG. 6 shows an attachment portion of the canceler in the conventional wet-type multiple disc clutch. As shown in FIG. 6, the canceler 41 is detained by the stop ring 49 which is fitted in an annular groove 47 on the inner tube 13 of the clutch case, and the canceler 41 is provided with a projected portion 51 for preventing a removal or fall of the stop ring 49. In this device, when the clutch is released and the urging force of the return spring (not shown) is weakened, the canceler 41 is moved toward the cylinder chamber side (to the left in the drawing) by the pressure of the lubricating oil inside the take-off clutch case, as shown in FIG. 7, whereby the stop ring 49 is freed from the restriction by the projected portion 51. Consequently, there arise such inconveniences that the size of the stop ring 49 is expanded due to a vibration of the engine or a running vibration, so as to remove or fall out of the annular groove 47, or the canceler 41, the return spring, or the like, detained by the stop ring 49 falls out inside the clutch case, thereby preventing release of the clutch.

SUMMARY OF THE INVENTION

The present invention has been contrived taking the above-described circumstances into consideration, and an object thereof is to provide a wet-type multiple disc clutch which is capable of preventing a stop ring for fixing a canceler from falling out.

In order to solve the above-described problems, according to the present invention, there is proposed a wet-type multiple disc clutch in which a clutch plate set having a plurality of friction plates and separator plates alternately provided therein is interposed between a clutch case and a clutch hub, an oil pressure piston serving to fasten the clutch plate set is slidably retained in a cylinder chamber formed between the outer tube and the inner tube of the clutch case, and a canceler for defining a centrifugal oil pressure cancel chamber between the oil pressure piston and the clutch case is secured onto the inner tube of the clutch case through a stop ring, which wet-type multiple disc clutch comprising a stop ring fall-out preventing means for preventing a fall of the stop ring.

Also according to the present invention, the stop ring fall-out preventing means preferably comprises a step portion which is formed on the inner tube of the clutch case for restricting a movement of the stop ring toward the oil pressure piston side, and a detention portion which is formed on the canceler for restricting the size expansion of the stop ring.

Also according to the present invention, the stop ring fall-out preventing means preferably comprises a step portion which is formed on the inner tube of the clutch case for restricting a movement of the stop ring toward the oil pressure piston side, and a detention ring to be fitted on the stop ring.

Also according to the present invention, the inner end surface on the clutch hub side of the inner tube of the clutch case may be supported by a thrust bearing and, at the same time, an axial movement of the detention ring may be restricted by the thrust bearing.

Also according to the present invention, a backing plate for axially supporting the clutch plate set with the clutch hub may be secured to the clutch case and sealing means may be interposed between the backing plate and the clutch hub.

According to the present invention, even if being built in a take-off clutch, the stop ring does not easily fall, so that dysfunction of the wet-type multiple disc clutch hardly occurs.

DETAILED DESCRIPTION OF THE PREFERRED EMBODIMENTS

Detailed description will be made below on an embodiment in which the present invention is applied to a wet-type multiple disc clutch built in a take-off clutch for an automatic transmission of a car, with reference to drawings.

Figure 1:
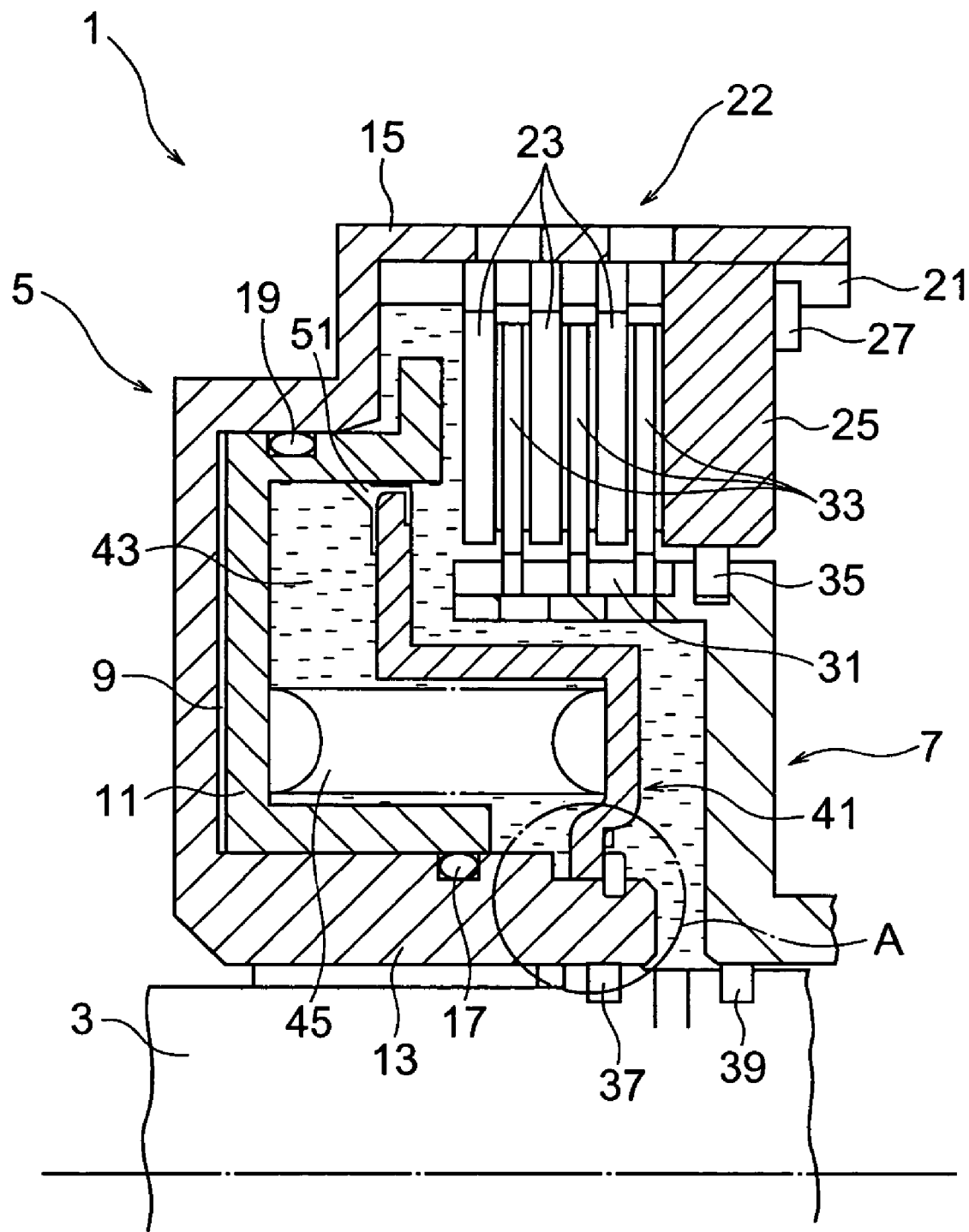
FIG. 1 is a longitudinally cross-sectional view of an essential part of a wet-type multiple disc clutch according to a first embodiment of the present invention.
Figure 2:
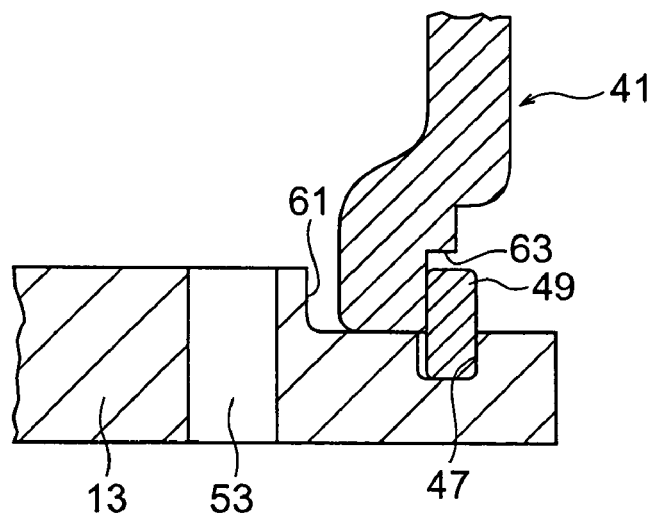
FIG. 2 is a view showing the portion A in FIG. 1 in an enlarged manner.

FIG. 1 is a longitudinally cross-sectional view of a principal part of a wet-type multiple disc clutch according to the first embodiment of the present invention, and FIG. 2 is a view showing the portion A in FIG. 1 in an enlarged manner. As shown in these drawings, the wet-type multiple disc clutch 1 is provided with a clutch case 5 which is connected to an input shaft 3, a hub 7 which is connected to an unrepresented transmission shaft, and an oil pressure piston 11 which is slidably fitted in a cylinder chamber 9 formed on the front end side of the clutch case 5 (in the left in FIG. 1). The clutch case 5 takes the form of a substantially double cylinder which integrally comprises an inner tube 13 and an outer tube 15. A gap between the cylinder chamber 9 and the oil pressure piston 11 is sealed with O rings 17 and 19.

A plurality of separator plates 23 (three in the illustrated case) as one of the constituent elements of a clutch plate set 22 and one backing plate 25 are slidably retained in the outer tube 15 of the clutch case 5 through a female spline 21 formed on the inner side thereof. These separator plates 23 and the backing plate 25 are prevented from falling out by a stop ring 27. On the other hand, a plurality of friction plates 33 (three in the illustrated case) as the other of the constituent elements of the clutch plate set 22 are slidably retained on the hub 7 through a male spline 31 formed on the outer periphery thereof in such a manner that they are interposed between the adjacent separator plates 23 and between one of the separator plates 23 and the backing plate 25. Referring to FIG. 1, a seal 35 is interposed between the backing plate 25 and the hub 7, and seals 37 and 39 are interposed between the input shaft 3 and the inner periphery of the clutch case 5 and between the input shaft 3 and the hub 7, respectively.

A canceler 41 which has a cross section in a substantially Z-shape is interposed between the oil pressure piston 11 and the inner tube 13 of the clutch case 5. While a centrifugal oil pressure cancel chamber 43 is defined between this canceler 41 and the oil pressure piston 11, a return spring 45 for urging the oil pressure piston 11 onto the side of a cylinder chamber 9 (in the left in FIG. 1) is detained and retained by the canceler 41. As shown in FIG. 2, the canceler 41 is detained by a stop ring 49 which is fitted in an annular groove 47 formed on the outer peripheral surface of the inner tube 13. In FIG. 1, a seal 51 is securely applied on the outer periphery of the canceler 41, and is slidably in contact with the inner peripheral surface on the outer side of the oil pressure piston 11. An oil hole 53 is formed on the inner tube 13 to introduce an operation oil into the centrifugal oil pressure cancel chamber 43 (see FIG. 2).

Figure 3:
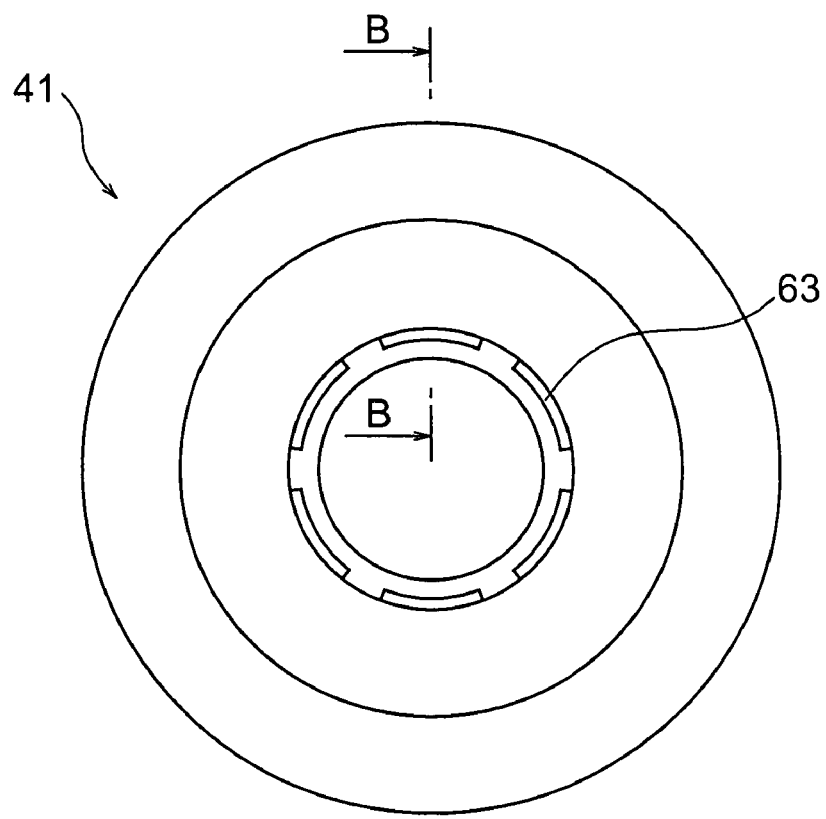
FIG. 3 is a back view of a canceler.
Figure 4:
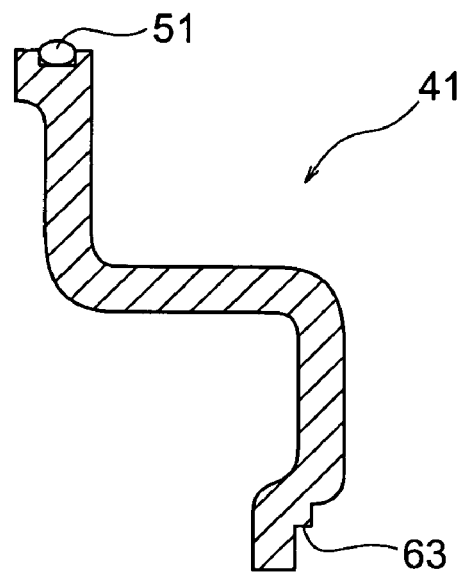
FIG. 4 is an enlarged cross-sectional view taken along the line B—B in FIG. 3.

While a step portion 61 for restricting a movement of the canceler 41 to the cylinder chamber 9 side is formed on the inner tube 13, a detention portion 63 for restricting the size expansion of the stop ring 49 is detained by the canceler 41. The step portion 61 and the detention portion 63 constitute stop ring fall-out preventing means. As shown in FIG. 3 and FIG. 4 (an enlarged cross-sectional view taken along the line B—B in FIG. 3), in case of the present embodiment, there are formed six detention portions 63 at regular angular intervals of 60° on the back surface of the canceler 63. However, the number of the detention portions may be any other than 6, and the detection portions may be formed annularly.

An operation of the present embodiment will be described below.

When a driver shifts a gear selector to the range D, or the like, to press the accelerator pedal, the operation oil is supplied to the cylinder chamber 9 through an unrepresented transmission control oil path, whereby the oil piston 11 shifts to the right in FIG. 1. Then, the separator plates 23 and the friction plates 33 of the clutch plate set 22 which are pressed by the oil pressure piston 11 are brought into frictional engagement with each other (to fasten the wet-type multiple disc clutch 1), and a rotation of the clutch case 5 (the input shaft 3) is transmitted to the hub 7, thereby transmitting the motive power of the engine to the automatic transmission. Thus, the wheels of the car are driven to start the car.

On the other hand, when the driver shifts the gear selector to the range P, the transmission control oil path which is connected to the cylinder chamber 9 is communicated with the discharge side, whereby the oil pressure piston 11 which is urged by the return spring 45 is moved to the left in FIG. 1. Thus, the frictional engagement between the separator plates 23 and the friction plates 33 of the clutch plate set 22 is released (to release the wet-type multiple disc clutch 1), and the transmission of the motive power of the engine to the automatic transmission is intercepted. On this occasion, the centrifugal oil pressure of the operation oil inside the cylinder chamber 9 is offset by the centrifugal oil pressure of the operation oil in the centrifugal oil pressure cancel chamber 43, whereby the oil pressure piston can be moved smoothly.

Incidentally, in the state that the wet-type multiple disc clutch 1 is released, the pressure of the lubricating oil acts on the canceler 41 inside the take-off clutch case, whereby the canceler 41 is urged to the left in FIGS. 1 and 2. However, in the present embodiment, since an axial movement of the canceler 41 is restricted by the step portion 61 of the inner tube 13, even if the canceler 41 is moved to the left in the drawing against the spring force of the return spring 45, the detention portion 63 of the canceler 41 hardly deviates from the outer periphery of the stop ring 49. As a result, even if a vibration of the engine, a running vibration or the like occurs, the stop ring 49 is difficult to fall out which may be caused by the size expansion thereof, and inconveniences of the conventional apparatus caused by a fall of the canceler 41, the return spring 45, or the like, inside the clutch case 5.

Figure 5:
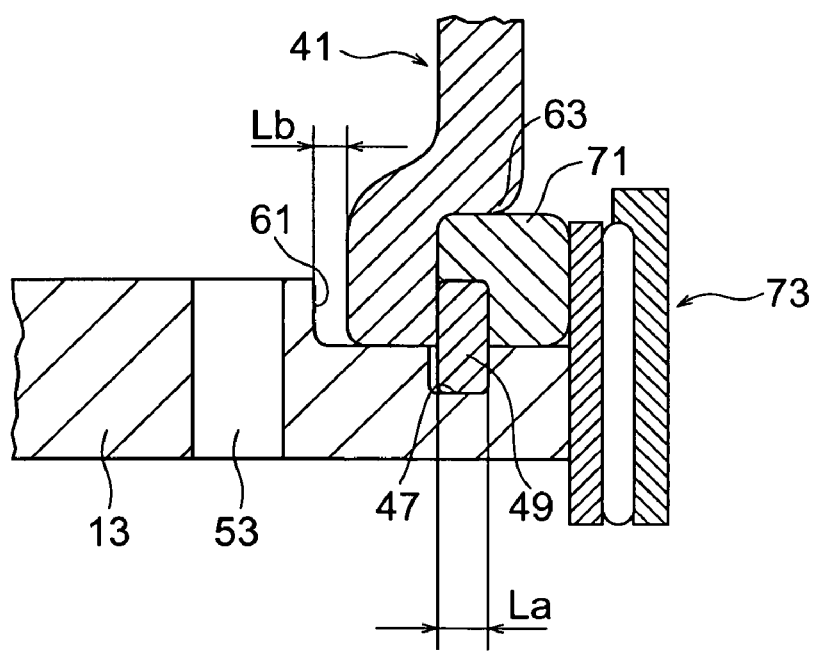
FIG. 5 is an enlarged view of a principal part of a wet-type multiple disc clutch according to a second embodiment of the present invention.
Figure 6:
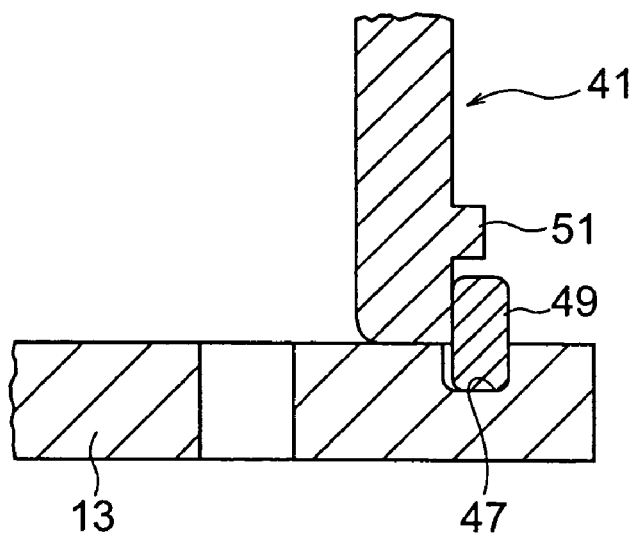
FIG. 6 is an enlarged view of a principal part of a conventional wet-type multiple disc clutch.
Figure 7:
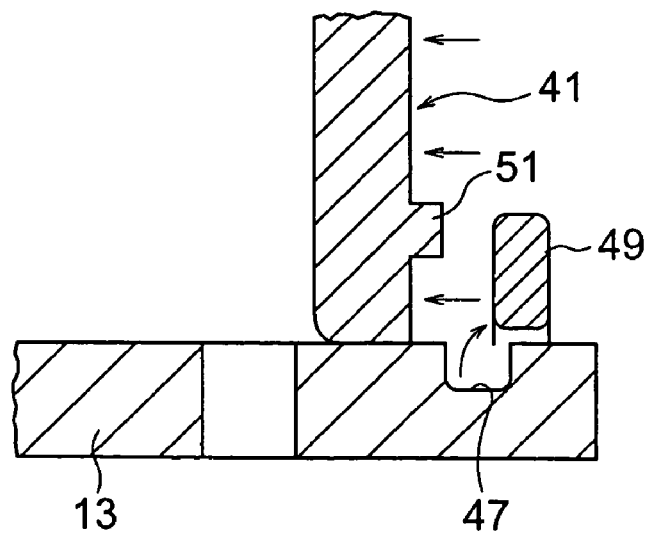
FIG. 7 is an enlarged view of a principal part for showing an operation of the conventional wet-type multiple disc clutch.

FIG. 5 is an enlarged view of a principal part of a wet-type multiple disc clutch according to a second embodiment of the present invention. The entire structure of this embodiment is substantially the same as that of the first embodiment, except the stop ring fall-out preventing means. That is, in the second embodiment, while a step portion 61 for restricting a movement of the canceler 41 toward the side of the cylinder chamber 9 is formed on the inner tube 13, a detention ring 71 is fitted on the stop ring 49. The inner tube 13 is supported by a thrust bearing 73 at the right end thereof in FIG. 5, and an axial movement of the detention ring 71 is restricted by this thrust bearing 73.

An operation of the second embodiment is also substantially the same as that of the first embodiment. However, the stop ring 49 is more difficult to fall since the fit length La between the stop ring 49 and the detention ring 71 is larger than a movable amount Lb of the canceler 41.

The embodiments of the present invention are as specifically described above. However, the present invention is not limited to these embodiments. For example, though in each of the foregoing embodiments, the present invention is applied to the wet-type multiple disc clutch which is built in a take-off clutch, the present invention may be applied to a wet-type multiple disc clutch of the other type. Moreover, the stop ring fall-out preventing means is not limited to that described in the foregoing embodiments, but may be fastening means of screw type or other various means. In addition, the specific structure of the wet-type multiple disc clutch, the specific form of the canceler, and the like, can be properly altered within the scope and spirit of the present invention.

According to the friction plate of the present invention, in a wet-type multiple disc clutch in which a clutch plate set having a plurality of friction plates and a plurality of separator plates alternately provided therein is interposed between a clutch case and a clutch hub, an oil pressure piston serving to fasten the clutch plate set is slidably retained in a cylinder chamber formed between the outer tube and the inner tube of the clutch case, and a canceler for defining a centrifugal oil pressure cancel chamber between the oil pressure piston and the clutch case is secured onto the inner tuber of the clutch case through a stop ring, there is provided stop ring fall-out preventing means for preventing a fall of the stop ring. As a result, even when being built in the take-off clutch, or the like, the stop ring does not easily fall out, whereby the wet-type multiple disc clutch hardly becomes dysfunctional.

What is claimed is:

1. A wet-type multiple disc clutch in which a clutch plate set having a plurality of friction plates and a plurality of separator plates alternately provided therein is interposed between a clutch case and a clutch hub, an oil pressure piston serving to fasten said clutch plate set is slidably retained in a cylinder chamber formed between an outer cylindrical member and an inner cylindrical member of said clutch case, and a canceler for defining a centrifugal oil pressure cancel chamber between said oil pressure piston and said clutch case is secured on the inner cylindrical member of said clutch case through a stop ring, the wet-type multiple disc clutch comprising:

stop ring fall-out preventing means for preventing a fall of said stop ring, wherein said stop ring fall-out preventing means comprises a step portion which is formed on the inner cylindrical member of said clutch case for restricting movement of said canceler toward said oil pressure piston side, and a detention portion, including a detention member formed on said canceler, for restricting size expansion of said stop ring when said canceler is at a position in which it is stopped by said step portion.

2. A wet-type multiple disc clutch in which a clutch plate set having a plurality of friction plates and a plurality of separator plates alternately provided therein is interposed between a clutch case and a clutch hub, an oil pressure piston serving to fasten said clutch plate set is slidably retained in a cylinder chamber formed between an outer cylindrical member and an inner cylindrical member of said clutch case, and a canceler for defining a centrifugal oil pressure cancel chamber between said oil pressure piston and said clutch case is secured on the inner cylindrical member of said clutch case through a stop ring, the wet-type multiple disc clutch comprising:

stop ring fall-out preventing means for preventing a fall of said stop ring, wherein said stop ring fall-out preventing means comprises a step portion which is formed on the inner cylindrical member of said clutch case for restricting a movement of said canceler toward said oil pressure piston side, and a detention ring to be fitted on said stop ring.

3. A wet-type multiple disc clutch according to claim 2, wherein an inner end surface on said clutch hub side of said inner cylindrical member of said clutch case is supported by a thrust bearing and, at the same time, an axial movement of said detention ring is restricted by said thrust bearing.

4. A wet-type multiple disc clutch according to claim 3, wherein a backing plate for axially supporting said clutch plate set with said clutch hub is secured to said clutch case and a sealing means is interposed between said backing plate and said clutch hub.

5. A wet-type multiple disc clutch according to claim 2, wherein a backing plate for axially supporting said clutch plate set with said clutch hub is secured to said clutch case and a sealing means is interposed between said backing plate and said clutch hub.

6. A wet-type multiple disc clutch in which a clutch plate set having a plurality of friction plates and a plurality of separator plates alternately provided therein is interposed between a clutch case and a clutch hub, an oil pressure piston serving to fasten said clutch plate set is slidably retained in a cylinder chamber formed between an outer cylindrical member and an inner cylindrical member of said clutch case, and a canceler for defining a centrifugal oil pressure cancel chamber between said oil pressure piston and said clutch case is secured on the inner cylindrical member of said clutch case through a stop ring, the wet-type multiple disc clutch comprising:

stop ring fall-out preventing means for preventing a fall of said stop ring, wherein a backing plate for axially supporting said clutch plate set with said clutch hub is secured to said clutch case and a sealing means is interposed between said backing plate and said clutch hub.

7. A wet-type multiple disc clutch in which a clutch plate set having a plurality of friction plates and a plurality of separator plates alternately provided therein is interposed between a clutch case and a clutch hub, an oil pressure piston serving to fasten said clutch plate set is slidably retained in a cylinder chamber formed between an outer cylindrical member and an inner cylindrical member of said clutch case, and a canceler for defining a centrifugal oil pressure cancel chamber between said oil pressure piston and said clutch case is secured on the inner cylindrical member of said clutch case through a stop ring, the wet-type multiple disc clutch comprising:

stop ring fall-out preventing means for preventing a fall of said stop ring, wherein said stop ring fall-out preventing means comprises a step portion which is formed on the inner cylindrical member of said clutch case for restricting a movement of said canceler toward said oil pressure piston side, and a detention portion which is formed on said canceler for restricting size expansion of said stop ring, and wherein a backing plate for axially supporting said clutch plate set with said clutch hub is secured to said clutch case and a sealing means is interposed between said backing plate and said clutch hub.

8. A multiple disc clutch, comprising:

a clutch plate set having a plurality of friction plates and a plurality of separator plates alternately provided therein and interposed between a clutch case and a clutch hub;

an oil pressure piston serving to fasten said clutch plate set slidably retained in a cylinder chamber formed between an outer cylindrical member and an inner cylindrical member of said clutch case; and a canceler which is disposed for defining an oil pressure cancel chamber between said oil pressure piston and said clutch case and which is secured on the inner cylindrical member of said clutch case through a stop ring disposed in a recessed portion of said inner cylindrical member, said canceler being axially movable toward said oil pressure piston to a limit position at which the movement of said canceler is stopped by a movement restricting member, wherein a detention structure is provided having a detention member positioned laterally outward of said stop ring to block said stop ring from escaping said recessed portion of said inner cylindrical member when said canceler is at said limit position.

9. A wet-type multiple disc clutch according to claim 8, wherein said detention member is disposed on said canceler.

10. A wet-type multiple disc clutch according to claim 9, wherein a backing plate for axially supporting said clutch plate set with said clutch hub is secured to said clutch case and a sealing structure is interposed between said backing plate and said clutch hub.

11. A wet-type multiple disc clutch according to claim 8, wherein said detention structure includes a detention ring fitted on said stop ring.

12. A wet-type multiple disc clutch according to claim 11, wherein an inner end surface on said clutch hub side of said inner cylindrical member of said clutch case is supported by a thrust bearing, and an axial movement of said detention ring is restricted by said thrust bearing.

13. A wet-type multiple disc clutch according to claim 12, wherein a backing plate for axially supporting said clutch plate set with said clutch hub is secured to said clutch case and a sealing structure is interposed between said backing plate and said clutch hub.

14. A wet-type multiple disc clutch according to claim 11, wherein a backing plate for axially supporting said clutch plate set with said clutch hub is secured to said clutch case and a sealing structure is interposed between said backing plate and said clutch hub.

15. A wet-type multiple disc clutch according to claim 8, wherein a backing plate for axially supporting said clutch plate set with said clutch hub is secured to said clutch case and a sealing structure is interposed between said backing plate and said clutch hub.

* * * * *